Aug. 11, 1925.
R. HARPER
VARIABLE SPEED DRIVE PULLEY
Filed Oct. 13 1924
1,549,117
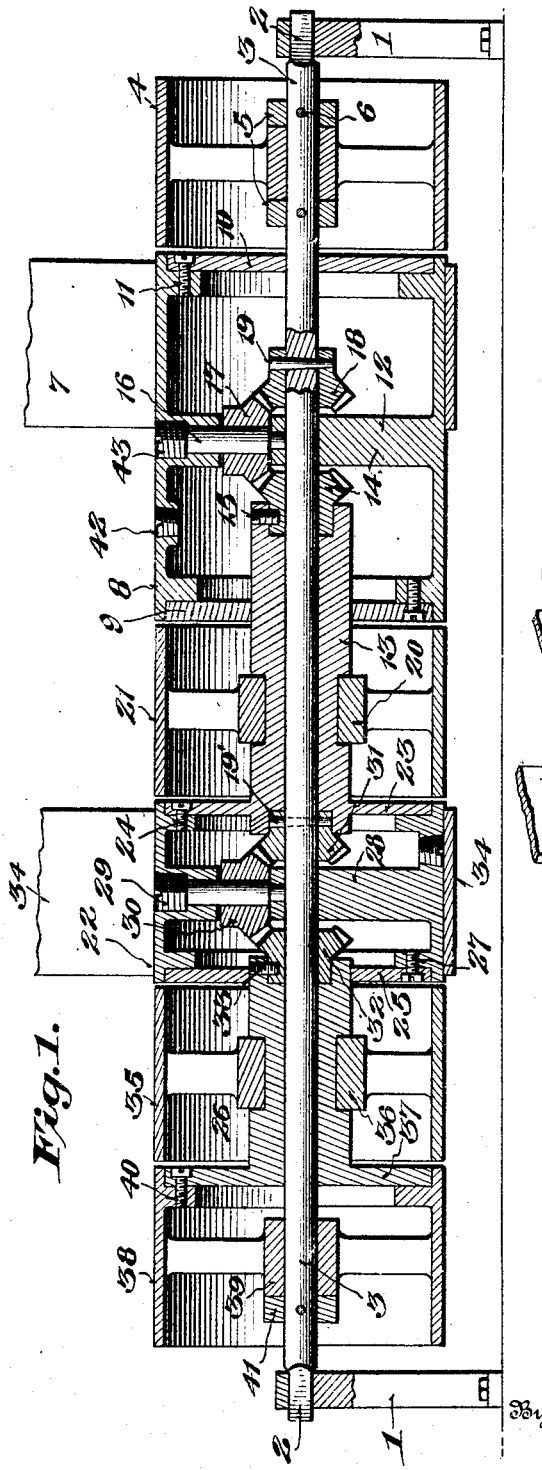
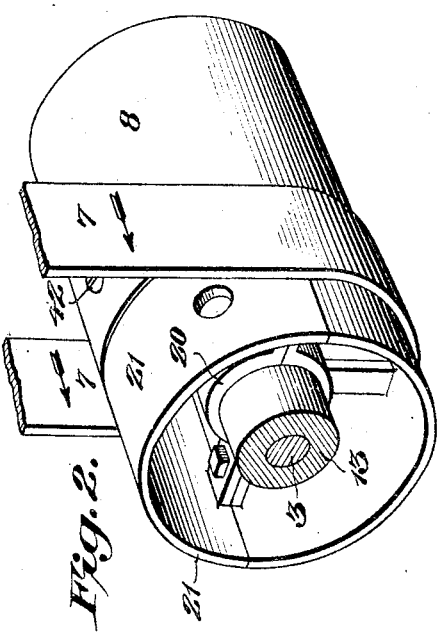
Inventor
Roy Harper,
By William C. Linton
Attorney Patented Aug. 11, 1925.

1,549,117

UNITED STATES PATENT OFFICE.

ROY HARPER, OF DALLAS, TEXAS.

VARIABLE-SPEED DRIVE PULLEY.

Application filed October 13, 1924. Serial No. 743,480.

*To all whom it may concern:*

Be it known that I, ROY HARPER, a citizen of the United States of America, residing at Dallas, county of Dallas, State of Texas, have invented certain new and useful Improvements in Variable-Speed Drive Pulleys; and I do hereby declare that the following is a full, clear, concise, and exact description of the invention, such as will enable others skilled in the art to which it appertains to make and use the same.

This invention relates to improvements in variable or change speed gearing, having for an object to provide a novel form of variable speed drive pulley, especially advantageous for use in the transmission of motion by belt gearing, whereby motion at the desired or selected rate of speed may be transmitted to the driven belt gearing.

It is likewise an object of the invention to provide a variable speed drive utilizing a novel arrangement of pulleys so positioned and of such relative size as to permit of the ready shifting of the driven belt from one pulley to another in order that the desired speed of the same may be attained without troublesome shifting of gears or similar mechanisms or in any way interrupting, with resultant delays, the transmission of motion to a mechanism driven from the invention.

It is also an object of the invention to provide means whereby with the shifting of the driven belt from one speed to another, the same will be first completely disengaged from the first or previously engaged pulley before coming into driving relation with another, hence, preventing any possibility of an uneven transmission of power to the driven belt or slippage thereof.

Other objects of the invention will be in part obvious, and in part pointed out hereinafter.

In order that the invention and its mode of operation may be readily understood by persons skilled in the art, I have in the accompanying illustrative drawings, and in the detailed following description based thereupon, set out one possible embodiment of the same.

In these drawings:—

Figure 1 is a vertical longitudinal section through the improved variable speed drive pulley; and, Figure 2 is a fragmentary detail in perspective thereof showing the arrangement of one of the driving pulleys and one of the idler pulleys, the driven belt being in a position whereat it is shifted from one to another preparatory to the selection of the desired driving speed.

Having more particular reference to the drawings, in connection with which like characters of reference will designate corresponding parts throughout, the improved device may be stated to comprise opposed or spaced bearing pillars 1 having the squared ends 2 of a supporting rod, circular in cross-section, indicated by the numeral 3, engaged therein, as is shown in the Figure 1, whereby rotation of such rod upon the pillars 1 will be prevented. Loosely mounted upon and rotatable about one portion of the supporting rod 3 is an idler pulley 4 whose lateral movement along the rod 3 is prevented through the medium of stop collars or bearing collars 5 suitably connected to adjacent portions of the rod 3 as by locking pins 6 passing through adjacent diametrical portions of such collars and the rod 3. This idler pulley 4 is adapted, at times, to receive the driving belt 7 thereabout, as for example when it is desired to absolutely or completely interrupt the transmission of rotary motion to the variable speed drive pulley.

A double driving pulley 8 is next provided on the supporting rod 3 and as will be noted, finds bearing upon adjacent portions of such rod 3 through the provision of end or bearing walls 9 and 10 seated in the opposite extremities of the double pulley 8 and secured thereto through the medium of locking screws or similar fastening devices 11. Also, a web portion 12 is formed within the double drive pulley 8 and is provided with a concentrically arranged bearing opening adapted to receive the adjacent portion of the supporting rod therethrough as is clearly shown in the accompanying drawing.

Mounted upon an intermediate portion of the supporting rod 3 and disposed longitudinally or in parallel relation thereto is a hollow shaft 13 having a bevelled gear 14 fixedly mounted upon one end thereof and as shown in this particular embodiment of the invention, being secured against rotary motion with respect to such shaft through the medium of a locking or set screw 15. At this point, it is to be noted that the bearing opening of the wall 9 adjacent the shaft 13 is larger than the bearing opening in the wall 10 which directly engages the supporting rod 3 in order that proper bearing engagement of the former wall with respect to the diametrically larger hollow shaft 13 will be effected.

Received in a suitable radially disposed bearing formed in the interiorly positioned web 12 of the double drive pulley 8 is a stub shaft 16 fixedly carrying a bevel gear 17 upon its inner end, such bevel gear 17 being received in a suitable aperture or seat provided therefor in an adjacent portion of the web 12 and meshing with the gear 14 fixedly connected to the hollow shaft 13 rotatable about the supporting rod 3. This bevel gear 17, which is in form of an idler, also continuously meshes with a bevel gear 18 mounted upon an adjacent portion of the supporting rod 3 in opposed relation to the gear 14; said bevel gear 18 being immovably secured or anchored to the supporting rod 3 through the medium of a connecting pin 19 passing through its collar portion and through the adjacent diametric portion of said supporting rod 3. Because of this arrangement of gearing, including the bevel gears 14, 17 and 18, it will be understood that with the transmission of rotary motion to the double drive pulley 8 from the driving belt 7 engaging the proper portion of its peripheral surface, the bevel gear 17 will be caused to move in an orbital path of travel about the supporting rod 3 due to the meshing of its teeth with the bevel gear 18 fixedly mounted upon said supporting rod. At the same time, the gear 17 will be rotated upon its stub shaft 16 and in consequence, will impart rotary motion to the bevel gear 14 fixedly connected through the medium of the locking screw 15 to the hollow shaft 13. By reason of the mode of transmission of rotary motion to the shaft 13 from the gearing aforesaid, it will be understood that the same will be a ratio of two to one with respect to the rate of speed at which the driving pulley 8 is being driven from the driving belt 7. Thus, it follows that the motion transmitted from the shaft 13 in the manner hereinafter more fully described, is double that of the drive pulley 8.

An intermediate portion of the hollow shaft 13 is provided with a circumferentially disposed bearing groove loosely receiving the hub portion 20 of an idler pulley 21 therein, the diameter of this idler pulley corresponding to the diameter of the pulley 8 for a purpose which will be subsequently apparent.

A second drive transmitting pulley 22 corresponding in diameter of the double drive pulley 8 and the idler pulley 21 is provided upon the supporting rod 3, said driving pulley 22 being rotatably mounted with respect to the rod 3 through the provision of a circular web or disk 23 carried upon the adjacent end of the hollow shaft 13, said disk 23 being seated within an adjacent end of the driving pulley 22 and connected thereto through the medium of locking screws 24 or similar fastening devices. The opposite side of the driving pulley 22 receives a circular bearing wall 25 therein provided with a concentrically arranged bearing opening adapted to be engaged over a second hollow shaft 26 disposed longitudinally of and rotatable about the rod 3; the outer portions of said bearing wall being fixedly connected to adjacent portions of the receiving end of the driving pulley 22 through the medium of screws or similar fastening devices 27.

The driving pulley 22 is provided with an internal circular web 28 having a radially disposed stub shaft 29 mounted therein, the inner end of which carries a bevel gear 30 received in an aperture or seat provided therefor in an adjacent portion of said web 28 as shown in the Figure 1. This bevel gear 30 constantly meshes with the teeth of a bevel gear 31 immovably mounted upon an adjacent portion of the supporting rod 3, being connected to such rod through the medium of a key or pin 19'. The bevel gear 30 also is constantly enmeshed with the teeth of a bevel gear 32, fixedly connected by way of its collar with the adjacent end of the second hollow shaft 26, such connection being effected by means of a set or connecting screw 33. At this point, it may be noted that with transmission of rotary motion to the driving pulley 22 from the circular web or disk 23 carried upon one end of the hollow shaft 13, the bevel gear 30 will be moved in an orbital path of travel about the supporting rod 3 and simultaneously with such rotation, will transmit rotary motion to the bevel gear 32 connected to the adjacent end of the second hollow shaft 26. Consequent upon this operation, it will be understood that the rate of speed at which the driving pulley 22 is rotated, will be materially greater than that at which the double pulley 8 is being rotated, and in consequence, with engagement of the driven belt 34 about the same, as shown in the drawing, a greater motion will, of course, be transmitted to such belt.

Another idler pulley 35 corresponding in diameter to the idler 21 is loosely mounted upon the intermediate portion of the second hollow shaft 26, the hub portion 36 of such idler pulley 35 being loosely engaged in a circumferentially disposed bearing groove formed in the second hollow shaft 26, as shown, and in consequence, being laterally immovable with respect to the driving pulley 22 adjacent which it is positioned.

The remaining end of the second hollow shaft 26 is formed with a circular web or disk-like extension 37 adapted to be seated in the adjacent end of a third driving pulley 38, whose hub portion 39 is rotatably mounted upon an adjacent portion of the supporting rod 3. This driving pulley 38 is securely connected to the web-like extension or disk 37 through the medium of suitable screws 40 or similar fastening devices, and hence, it will be understood that motion transmitted to the second hollow shaft 26 will, in turn, be transmitted to the third driving pulley 38, hence, driving the same at a rate of speed double that at which the driving pulley 22 is being rotated because of the arrangement and functioning of the enmeshed bevel gears 30, 31 and 32.

To prevent lateral movement of the third driving pulley 38 upon the supporting rod 3, a stop collar 41 is arranged upon said rod 3 and has bearing engagement upon an adjacent portion of the hub 39 of the third driving pulley 38.

The modus operandi of the improved variable speed drive pulley may be stated to be as follows:—

Rotary motion is transmitted to the double driving pulley 8 by way of the driving belt 7 engaged thereabout in the manner as shown in the Figure 1. When it is desired that a corresponding motion shall be transmitted to the mechanism connected to the invention, the driven belt 34 is, of course, engaged over the remaining peripheral portion of the double drive pulley 8 whereupon a uniform transmission of speed from the device will be effected. When, however, it is desired that a rate of speed in ratio of approximately two to one shall be transmitted to the driven belt 34, said belt 34 is shifted by hand or by suitable mechanical means common in the art from its original position upon the double drive pulley 8 onto the idler 21, thus completely disengaging the same from said double drive pulley 8. The belt is then continued along in its shifting whereupon it will be brought into engagement with the peripheral surface of the second driving pulley 22, which by reason of the functioning of the gearing 14, 17 and 18, is being rotated at a rate of speed approximately double that of the driving pulley 8. Should the transmission of increased speed to the driven belt be desired, said driven belt is now shifted so as to become disengaged from the second driving pulley 22 and moved onto the idler 35, whereupon with such complete disengagement of the same from the driving pulley 22, the driven belt is then engaged about the third driving pulley 38, which pulley is being rotated at a rate of speed double that of the driving pulley 22, this being brought about by reason of the arrangement and functioning of the gearing 30, 31 and 32, heretofore described. Thus, it will be understood that a variable speed may be imparted to the driven shaft 34 with but simple longitudinal shifting of the driven belt along the juxtaposed idler and driving pulleys aforesaid. During such shifting movement of the belt, it will be understood that the same will be completely disengaged from the previously engaged driving pulley before it is brought into engagement with that particular driving pulley which will transmit the selected or desired speed to the same. In consequence, the transmission of an uneven drive to the driven belt 34 or the dragging of the variable speed drive pulley by its partial engagement with several drive pulleys will be absolutely prevented. Furthermore, because of the fact that the various drive pulleys and idlers are of a corresponding diameter, it will be understood that the several belts 7 and 34 may be shifted to their different positions as may be required with facility and without in any way affecting, that is, increasing or decreasing, the necessary tensioning of either of the same whereby to insure their proper performance of duty.

It has been found desirable to provide the variable speed drive pulley with some form of lubricating means and to this end and for purposes of illustration, I have herein shown the driving pulleys 8 and 22 as being provided with peripherally disposed internally screw threaded apertures through which lubricant is adapted to be introduced into the same in order that it may flow into engagement with and properly lubricate the functioning gearing 14, 17, 18, 30, 31 and 32. These apertures are normally closed by suitable screw threaded plugs 42. Also, it may be noted at this point that the openings through which the stub shafts 16 and 29 are passed are adapted to be closed by means of screw threaded bearing plugs 43 engaged in enlarged outer portions of the same as clearly shown in the Figure 1. In this way, it will be understood that wear of the stub shafts 16 and 29 may be compensated for merely by slight adjustment of the screw threaded bearing plugs 43 with respect to the screw threaded openings receiving the same in the several pulleys 8 and 22. Furthermore, if desired, suitable packing, not shown, may be provided the disks 9, 10, 23 and 25 whereby to prevent the leakage of lubricant from the driving pulleys 8 and 22.

While I have herein shown my improved variable speed drive pulley as being productive of three different speeds, it is, of course, to be fully understood and appreciated that any number of speed ratios may be had from the device merely by increasing or decreasing the arrangement and number of the inter-meshing bevel gears, such for example, as those groups of gears indicated by the numerals 14, 17 and 18, and correspondingly increasing or decreasing the number of drive pulleys connected to the same.

Manifestly, the construction shown is capable of considerable modification, and such modification as is within the scope of my claims, I consider within the spirit of my invention.

I claim:—

1. A variable speed drive comprising a supporting rod, a double pulley rotatably mounted thereon, a hollow shaft engaged over said rod, rotatable means carried within said double pulley connected to and rotatable about said rod and geared to said hollow shaft adapted to transmit rotary motion thereto, and a second pulley rotatable upon said rod connected to the opposite end of the hollow shaft.

2. A variable speed drive comprising a supporting rod, a double pulley rotatably mounted thereon, a plurality of relatively spaced hollow shafts engaged over said rod, rotatable means geared to each of said shafts and connected to and rotatable about said rod adapted to transmit rotary motion to their respective hollow shafts, and other pulleys fixedly connected to said hollow shafts.

3. A variable speed drive comprising a supporting rod, a double pulley rotatably mounted thereon, a plurality of spaced hollow shafts engaged over said rod, pulleys fixedly connected to portions of said hollow shafts, rotatable means carried within said double pulley and said second-mentioned pulleys connected to and rotatable about adjacent portions of said rod and geared to the adjacent hollow shafts adapted to transmit motion thereto, and idler pulleys mounted upon portions of said hollow shafts and positioned between said drive pulleys, said idler pulleys corresponding in diameter to the diameter of the drive pulleys whereby to provide a continuous belt engaging surface.

4. A variable speed drive comprising a supporting rod, a double pulley rotatably mounted thereon, a hollow shaft engaged over said rod, a bevel gear carried within said double pulley, a bevel gear immovably mounted upon a portion of said supporting rod meshing with said first bevel gear, another bevel gear fixedly connected to one end of said hollow shaft and meshing with said first bevel gear, an idler pulley mounted upon the intermediate portion of said hollow shaft, and a drive pulley rotatably mounted upon the supporting rod and fixedly connected to the remaining end of said hollow shaft.

5. A variable speed drive comprising a non-rotatable supporting rod, a double pulley rotatably mounted thereon, an internal web within said double pulley having a bearing opening through the same receiving an adjacent portion of the supporting rod, a plurality of spaced hollow shafts engaged over said rod, disks fixedly carried upon certain of the ends of each of said hollow shafts, driving pulleys rotatable upon portions of said supporting rod and fixedly connected to said disks, a bevel gear rotatably mounted adjacent the internal web in said double pulley, a second bevel gear immovably secured to a portion of said supporting rod and meshing with said first bevel gear, another bevel gear fixedly connected to one end of the adjacent hollow shaft and meshing with said first bevel gear, another bevel gear rotatably carried within another of the driving pulleys, a bevel gear immovably secured to a portion of said supporting rod and meshing with said last-mentioned bevel gear, another bevel gear fixedly connected to one end of the adjacent and remaining hollow shaft and meshing with said last-mentioned bevel gear, and idler pulleys loosely mounted upon intermediate portions of said hollow shafts arranged between each of said driving and double pulleys, said double, driving and idler pulleys being of corresponding diameters, whereby to provide an even and continuous gearing belt engaging surface.

In witness whereof I have hereunto set my hand.

ROY HARPER.